United States Patent
Megathlin et al.

(10) Patent No.: US 12,301,448 B2
(45) Date of Patent: May 13, 2025

(54) COORDINATING HOST LINK STATUS AND ASSOCIATED EGRESS FILTER

(71) Applicant: Arista Networks, Inc., Santa Clara, CA (US)

(72) Inventors: Ryan Megathlin, Woburn, MA (US); Victor Wen, San Jose, CA (US); Craig Lauer, Bolton, MA (US); Vijay Mahadevan, Milpitas, CA (US); Christopher Roche, Methuen, MA (US)

(73) Assignee: ARISTA NETWORKS, INC., Santa Clara, CA (US)

( * ) Notice: Subject to any disclaimer, the term of this patent is extended or adjusted under 35 U.S.C. 154(b) by 0 days.

(21) Appl. No.: 17/877,373

(22) Filed: Jul. 29, 2022

(65) Prior Publication Data

US 2024/0039834 A1 Feb. 1, 2024

(51) Int. Cl.
*H04L 45/24* (2022.01)
*H04L 45/12* (2022.01)
*H04L 45/745* (2022.01)

(52) U.S. Cl.
CPC .......... *H04L 45/245* (2013.01); *H04L 45/123* (2013.01); *H04L 45/745* (2013.01)

(58) Field of Classification Search
CPC ....... H04L 45/24; H04L 45/245; H04L 45/22; H04L 45/18; H04L 12/18; H04L 49/201;
(Continued)

(56) References Cited

U.S. PATENT DOCUMENTS

| 8,730,963 | B1* | 5/2014 | Grosser, Jr. | ........... H04L 45/245 370/227 |
| 2016/0301597 | A1* | 10/2016 | Jayakumar | ............ H04L 45/245 |

(Continued)

OTHER PUBLICATIONS

"Inter-Chassis Communication Protocol for Layer 2 Virtual Private Network (L2VPN) Provider Edge (PE) Redundancy", 2014 (Year: 2014).*

(Continued)

*Primary Examiner* — Messeret F Gebre
(74) *Attorney, Agent, or Firm* — Fountainhead Law Group, PC

(57) ABSTRACT

Methods, computer-readable media, and systems are disclosed for coordinating host link status and installation of egress filters in coordination with a multi-chassis link aggregation group (MLAG) peer. In response to receiving a request from an MLAG peer to install an egress filter, a local network device provides an indication that the local device has entered a local egress filter installed state. Next, a filter-installed watermark value associated with the local network device is incremented. The local network device provides an indication that the egress filter has been installed. Finally, in response to determining that the MLAG peer network device is not indicating a request peer to install filter status, a local network device indicates a link down status and uninstalls its local egress filter. Alternatively, in response to determining that the local network device is in a link up status, the local device indicates that an MLAG peer should install an egress filter. In response to determining that the peer network device is in a filter request status, installing a local egress filter.

20 Claims, 5 Drawing Sheets

(58) Field of Classification Search
CPC .............. H04L 65/611; H04L 47/806; H04L 2012/5642; H04L 45/28; H04L 45/123
See application file for complete search history.

(56) References Cited

U.S. PATENT DOCUMENTS

| | | | | |
|---|---|---|---|---|
| 2020/0153682 A1* | 5/2020 | Nidumolu | ............. | G06F 9/4416 |
| 2023/0327981 A1* | 10/2023 | Swaminathan | ....... | H04L 45/245 |
| | | | | 709/238 |
| 2024/0031272 A1* | 1/2024 | Ganesan | ............... | H04L 45/127 |

OTHER PUBLICATIONS

Gradeup "Computer Networks: transport layer", (Year: 2020).*

T. Singh, V. Jain and G. S. Babu, "VXLAN and EVPN for data center network transformation," 2017 8th International Conference on Computing, Communication and Networking Technologies (ICCCNT), Delhi, India, 2017, pp. 1-6 (Year: 2017).*

Noghani, K. A., Hernandez Benet, C., Kassler, A., Marotta, A., Jestin, P., & Srivastava, V. V. (2019). Automating ethernet VPN deployment in SDN-based data centers [arXiv]. ArXiv, , 6 pp (Year: 2019).*

D. Cai, A. Wielosz and S. Wei, "Evolve carrier ethernet architecture with SDN and segment routing," Proceeding of IEEE International Symposium on a World of Wireless, Mobile and Multimedia Networks 2014, Sydney, NSW, Australia, 2014, pp. 1-6 (Year: 2014).*

* cited by examiner

COORDINATING HOST LINK STATUS AND ASSOCIATED EGRESS FILTER

BACKGROUND

A multitude of network devices, such as routers and switching devices, can be deployed to implement data networks of various sizes and complexity. Such network devices include physical ports having certain characteristics, such as maximum throughput. A link aggregation group (LAG) involves combining multiple network connections in parallel to provide redundancy and/or to increase throughput beyond the capabilities of a single port. A Multi-chassis link aggregation group (MLAG) involves combining multiple parallel network connections associated with physical ports contained on physically separate network devices. Broadcast, unknown-unicast, and multicast (BUM) traffic is made up of network packets having multiple or indeterminate network destinations. Since BUM traffic may have multiple or unknown destinations, BUM traffic should be forwarded (once) from a particular network device to all other adjacent networking devices. However, in the context of multiple parallel MLAG connections, BUM traffic should not be sent out multiple times over the parallel MLAG connections, because such multiple transmissions may result in traffic loops or otherwise unnecessarily consume network and/or application resources through multiple transmission(s) of duplicate packets. To avoid such multiple packet delivery, a host link status corresponding to a single one of the parallel MLAG connections is designated as an active connection within a pair of MLAG pair devices. A BUM packet would then only be sent over the active connection. A parallel (inactive) MLAG connection to the active connection may be prevented from forwarding BUM traffic by installing an egress filter on the inactive MLAG connection.

BRIEF DESCRIPTION OF THE DRAWINGS

With respect to the discussion to follow, and in particular to the drawings, it is stressed that the particulars shown represent examples for purposes of illustrative discussion and are presented in the cause of providing a description of principles and conceptual aspects of the present disclosure. In this regard, no attempt is made to show implementation details beyond what is needed for a fundamental understanding of the present disclosure. The discussion to follow, in conjunction with the drawings, makes apparent to those of skill in the art how embodiments in accordance with the present disclosure may be practiced. Similar or same reference numbers may be used to identify or otherwise refer to similar or same elements in the various drawings and supporting descriptions. In the accompanying drawings.

DETAILED DESCRIPTION

Overview

Figure 1:
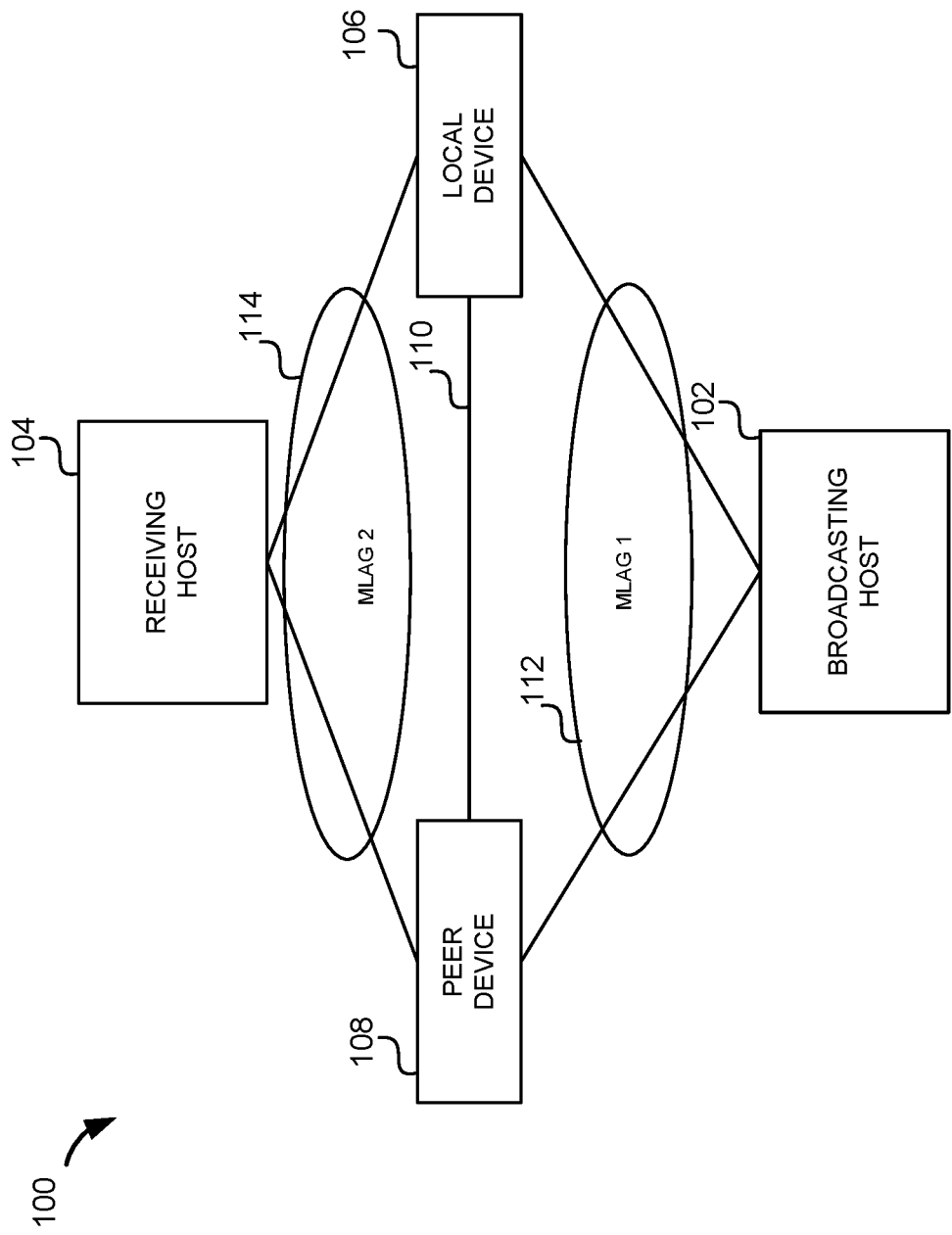
FIG. 1 illustrates an environment in which MLAG host link status and associated egress access are coordinated according to one or more embodiments.

However, when parallel MLAG connections fail over and/or when such connections are brought down and back up, egress filter synchronization issues may occur. Specifically, when one parallel connection of an MLAG interface between an MLAG-enabled pair of network devices is brought down followed by being restored, temporary multiple packet delivery and/or packet loops may be observed in connection with BUM traffic. A cause of such multiple delivery and/or packet loops relates to designation of host link status and timing of the egress filter being installed on each of the MLAG peers upon bringing back up of an interface on one device in an MLAG pair. Accordingly, a need exists for coordinating MLAG host link status and associated egress filter installation. In the context of coordinating MLAG host link status and associated egress filter installation, a distributed system is provided in which each MLAG peer makes its own decisions regarding egress filter installation and link status, based on state information received from a respective MLAG peer. To facilitate this, a local network device is able to request that an associated peer device's egress filter be installed, and the MLAG peer then sends a confirmatory response when the egress filter has been successfully installed. In some embodiments, a particular request by a local MLAG device for its corresponding peer MLAG device to install an egress filter may include a monotonically increasing watermark counter that can be used by the local MLAG device to confirm that a response from a peer MLAG device is, in fact, a response to the most recent request. In some embodiments, any response from a peer MLAG device to a request to install an egress filter may copy the watermark counter from the request to which the peer MLAG device is responding. In some embodiments, multiple instances of finite state machines (FSM) are employed.

A first FSM, the filter FSM, runs when MLAG support is enabled on a particular network device. In the filter FSM, if a local MLAG device observes that its peer's state is requesting the local MLAG device to install its egress filter, the local MLAG device may perform several steps. First the local MLAG device may receive the request to install an egress filter, preserving reference to any corresponding watermark counter associated with the request. Next, the local MLAG device may install its egress filter on a corresponding port. Finally, the local MLAG device may update its shared state indicating that the local MLAG device has installed its egress filter, with an associated watermark counter that is associated with the request to install the installed egress filter. This associated watermark counter may be referred to as a filter-installed watermark because the response with which the watermark is associated indicates that a corresponding egress filter has been installed.

A second FSM, the link FSM, operates as follows. In some embodiments, the Link FSM runs when both devices in an MLAG pair have loop protection configured that may be referred to as egress filter interlock loop protection. This configuration parameter (of a peer device) may also be observed in connection with observing a peer's state. When the local MLAG port-channel link state is in a "link request" or "link up," state, the link FSM operates to confirm or cause a corresponding peer MLAG port-channel to have a corresponding egress filter installed. When the local MLAG port-channel link state is in a "link down," state the link FSM releases the request to MLAG peer for installing egress filter on this MLAG port-channel. When transitioning to a FAIL state, a syslog error may be logged and then the Link FSM returns to a previous state ("link up"). In some embodiments, a timeout is employed when in the "link request"

state. When this timeout is exceeded, the local device goes link up regardless of other considerations. A subsequent observation of the MLAG peer's state requesting the local MLAG device to install its egress filter or to take its link down may cause the local MLAG device to install its egress filter and/or to take its link down on a particular port associated with the request from the peer MLAG device.

In some embodiments, upon initialization of an MLAG pair of network devices, an egress filter is in place on each MLAG interface to prevent any BUM traffic received across a peer-link connecting the MLAG pair from being forwarded on a particular interface (thus preventing double delivery, since the respective MLAG peer will have already forwarded the BUM traffic to the necessary destinations). The two devices in an MLAG pair can be referred to as a local device and a peer device. Egress filter installation on the local device is conditional on the port-channel state of the peer device and whether the peer device has requested the local device to install an egress filter.

In one possible double-delivery scenario, an address resolution protocol (ARP) packet may be broadcast from a broadcasting host over a bonded MLAG connection with a first (local) device and a second (peer) device. Under a relevant LAG hashing algorithm, this ARP (broadcast) packet may be sent from the broadcasting host to the local device, which will then broadcast the ARP packet to connected hosts, including, for the purposes of this example, to a receiving host. Under standard MLAG processes, the local device will also send the ARP packet over a peer link to the peer device. If an egress ACL is installed on the peer device, it will filter and not send the ARP packet to the receiving host. On the other hand, if the egress ACL is not installed when the ARP packet is received over the peer connection to the peer device, the peer device will send the ARP packet to all connected hosts, including the receiving host, causing the ARP packet to be sent twice to the receiving host.

Network Architecture

FIG. 1 illustrates an environment 100 in which MLAG host link status and associated egress access are coordinated according to one or more embodiments. In the context of environment 100, when broadcasting host 102 sends BUM traffic such as, for example, an ARP packet that includes proper destinations such as receiving host 104, the ARP packet should only be sent to receiving host 104 once. Software associated with receiving host 104 may be sufficiently robust to tolerate receiving multiple copies of the broadcast packets, however depending on the numerosity of multiple deliveries and possible loop conditions, it is generally undesirable to have multiple deliveries or loop conditions. In this example, a condition may occur where local device 106 is designated as being responsible for sending BUM traffic from first MLAG 112 to networks and devices connected to second MLAG 114. Under normal conditions, broadcasting host 102 may transmit an initial BUM packet via MLAG 112. For a given BUM packet sent by broadcasting host 102, only one of local device 106 or peer device 108 will receive the BUM packet due to LAG hashing. Under some configurations, both local device 106 and peer device 108 will transmit the received initial BUM packet over peer link 110 for the purpose of redundancy and in the event that one or the other of the MLAG peers either did not receive the initial BUM packet or one or the other of the MLAG peers cannot forward the initial BUM packet over second MLAG 114 to connected networks or destinations such as receiving host 104. In some other embodiments, the received initial BUM packet will selectively be transmitted over peer link 110 to one or the other peers depending on port configuration state of the MLAG peers.

In this example, should local device 106 be designated to forward BUM traffic to second MLAG 114, local device may also forward the BUM traffic over peer link 110 to peer device 108. However, in a case under which peer device 108 has an egress filter installed, the forwarded BUM traffic will not be transmitted from peer device 108 onto second MLAG 114 and further on to receiving host 104, which, were the BUM traffic to be forwarded, would result in multiple delivery. In other words, where local device 106 is operating with its link up on second MLAG 114, and peer device 108 has its egress filter installed, environment 100 will operate properly without multiple delivery. However, should there be a physical or logical disconnection or other disruption of the connection from local device 106 to second MLAG 114, i.e., local device 106 entering a link down condition to second MLAG 114, it may become necessary for peer device 108 to take over serving the purpose of redundancy in the overall MLAG configuration. In such an event, when the link of local device 106 goes down, the egress filter is removed on peer device 108, allowing BUM traffic on peer device 108 that is received over peer link 110 to be forwarded on second MLAG 114. Should local device 106 be restored and simply resume forwarding traffic (including BUM traffic), local device 106 may do so at such time as no egress filter is installed at peer device 108. Having both links up and both connections from local device 106 and peer device 108 transmitting with neither having an egress filter installed may result in multiple deliveries and traffic loops that may cause significant problems in the network, even if the condition exists only briefly before, for example, peer device 108 observes from the state of local device 106 that local device 106 is back up, and peer device can therefore re-install its egress filter.

To solve this problem, coordinating mechanisms are provided so that before a port-channel that is configured as an MLAG interface comes online, an egress filter may be installed on both MLAG peers. In some embodiments, packet loss may occur as follows. In an initial state, local device 106 has a connection to receiving host 104 that is in a "link down" state. Next, local device 106 has a connection that is coming up. By way of its link FSM, local device 106 instructs peer device 108 to install its egress filter. Next, peer device 108 installs its egress filter. At this point, peer device 108 is blocking all BUM traffic from peer link 110, but local device 106 cannot send traffic directly to 104 yet. For a brief period of time, packet loss may occur. Finally, local device 106 receives a response that peer device 108 has installed its egress filter. Thereafter local device 106 goes into a "link up" state and can transmit BUM traffic to receiving host 104. In some such embodiments, network devices may employ a command line interface (CLI) command to selectively enable or disable the herein described egress filter interlock feature.

Example Methods

Figure 2A:
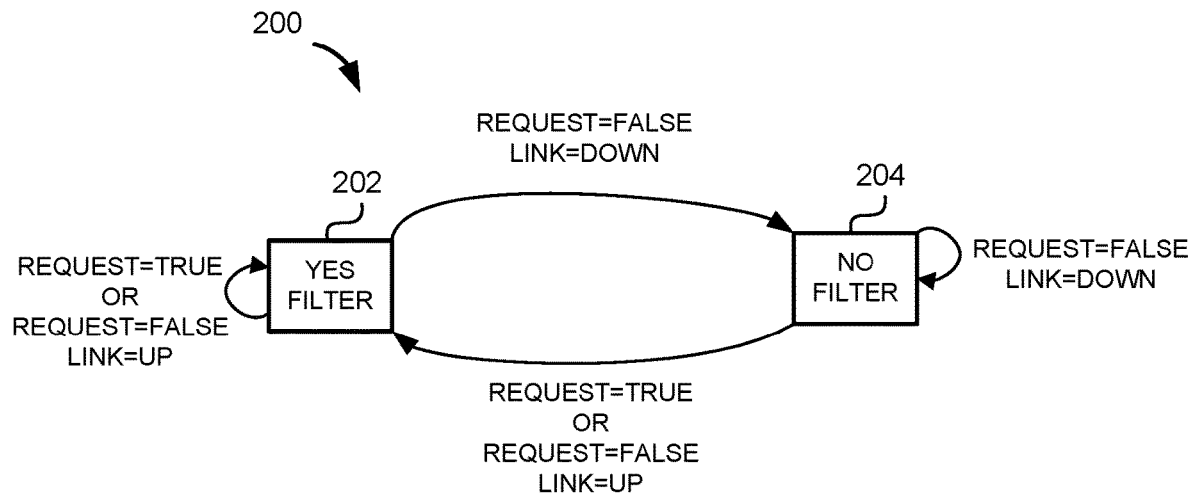
FIGS. 2A and 2B illustrate example state machines for coordinating MLAG host link status and associated egress filter installation according to one or more embodiments.

FIG. 2A illustrates example FSM 200 for coordinating egress filter installation according to one or more embodiments. In some embodiments, FSM 200 is provided on network devices that are generally able to participate in coordination of egress filter installation. Coordination mechanisms consistent with the present teachings provide both peer devices in a MLAG group the opportunity to communicate to a respective peer device that the peer device should have its egress filter installed. In some such embodiments, FSM 200 runs when a corresponding network device is configured to participate in the above-described coordination. Where a particular network device is configured to participate and the particular network device observes that its MLAG peer is also so configured, when either of the MLAG peers detects that its peer has requested that it install an egress filter, the particular network device may install an egress filter as follows. First the particular network device may observe that its peer is sending a request to install an egress filter. This is to say that the particular network device is observing that its peer is in a state of requesting the egress filter to be installed on that particular network device. Such a request may involve using two shared state variables. A first variable may correspond to a peer request to install and take a value of true or false. A second state variable may correspond to a peer's link status having a value of up or down. In some such embodiments, within the state associated with the request to install an egress filter, the peer network device may provide a watermark counter value associated with the request. In some such embodiments, the watermark counter may be a monotonically increasing integer corresponding to a sequence of requests. Such a monotonically increasing integer may be implemented by way of a fixed-bit-width variable or register that may overflow to zero when its maximum value is exceeded. In these embodiments, a value of zero (rollover) may be skipped and the counter incremented to a value of "1" which is treated as the next subsequent value in an associated monotonically increasing sequence of values such that a value of "1" in an overflow condition may nevertheless operate properly in connection with the herein described coordinating mechanisms.

Based on observed peer state variables, the particular network device may install its egress filter on a corresponding port. Finally, the particular network device may update its shared state indicating that the local MLAG device has installed its egress filter, with an associated watermark counter that is associated with the request. The response containing the associated watermark counter may be provided to a peer via shared state and may enable the peer network device to match up a logical sequence of the response with the corresponding request. In cases where either network device does not require its peer to install an egress filter, the corresponding network device may employ MLAG decision logic to determine whether it should install an egress filter.

As shown in FIG. 2A, where a local MLAG peer detects a new (value true) request to install its egress filter or a request value of false and where the peer's link is up, the local device transitions to state 202 and installs its egress filter. The local device will remain in state 202 as long as the request remains true or if the request is false and the peer's link is up. Where a local MLAG peer observes a peer request value of false and a peer's link value of down, the local device may transition to state 204, reflecting that the local device does not have its egress filter installed. Upon entering state 204, the local device may uninstall its egress filter. The local device will remain in state 204 as long as it observes that its peer request state is false and its peer's link is down.

Figure 2B:
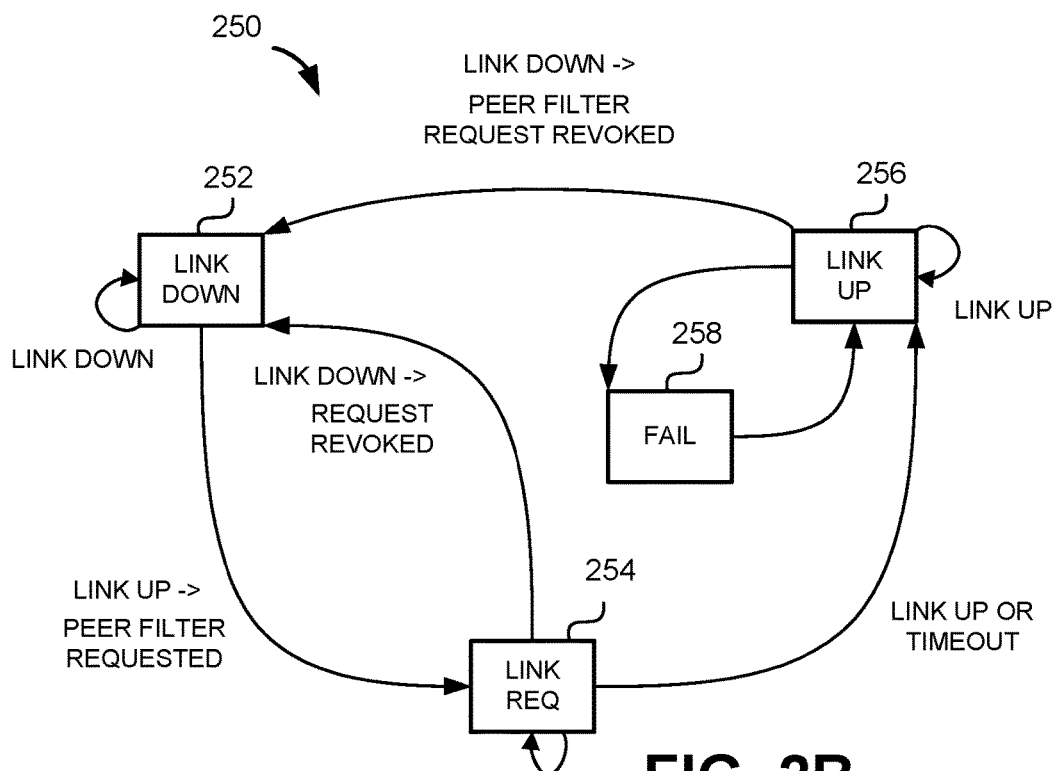

FIG. 2B illustrates example FSM 250 for coordinating MLAG host link status and associated egress filter installation according to one or more embodiments. As noted in connection with FIG. 2A, in some embodiments, FSM 250 is provided on network devices that are generally capable of participating in the coordination of MLAG member physical link status egress filter installation. An MLAG member physical link is the physical layer network connection that makes up one side of a link aggregation group. In some embodiments, this participation may be configurable in a particular network device, for example by way of a command line interface. Coordination mechanisms consistent with the present teachings provide both peer devices in a MLAG group an opportunity to coordinate link status in the context of egress filter installation. In some such embodiments, FSM 250 runs when a corresponding network device is configured to participate in the above-described coordination. First, a local network device may enter link down state 252 in which the local device is in a state of "link down." This state may occur at initialization of a local device within a MLAG group, or it may otherwise be caused to enter link down state 252 by way of configuration, CLI command, negotiation with its MLAG peer device, or other physical changes such as link hardware failure or unplugging of the physical link connection. From link down state 252, the local device may transition to an intermediate state of link request state 254. This intermediate state allows the local device to ensure that if an MLAG peer's link is up that the MLAG peer has its egress filter installed prior to forwarding BUM traffic by the local device. When the local device detects that at least one of its MLAG member physical links is up, it may transition from link down state 252 to link request state 254. When transitioning from link down state 252 to link requested state 254, the local device may send a request for its peer device to install an egress filter. As set forth above, such a request may include a watermark counter comprising a monotonically increasing integer to identify the request and to pair it up with any subsequently received response, which watermark may be used to validate that the response the local device received from its peer matches the request the local device sent when entering state 254. Once link requested state 254 has been entered, the local device may, for various reasons, revoke the request for its peer device to install an egress filter, for example when a physical connection associated with the local device's link goes down. In so doing, the local device returns to link down state 252. The local device may remain in link down state as long as it determines that all of its MLAG member physical links are down.

Alternatively, upon receiving a properly synchronized response that the peer device has completed installation of its egress filter, i.e., upon receiving a valid response to a filter install request, the local device may enter link up state 256. In some embodiments, a timeout is employed at link requested state 254, such that when a predetermined amount of time in link requested state 254 is exceeded, FSM 250 transitions to the link up state 256. This may occur when MLAG peers are initially synchronizing installation of egress filters. The local device may remain in link up state 256 as long as the local device has an MLAG member physical link that remains up and one of several conditions is met. A first condition is that the local device's egress filter is installed, the peer response is true and the peer's link is up. A second condition is that the local egress filter is not installed, the peer response is true, and the peer's link is down. A third condition is that the local egress filter is installed, the peer response is true, and the peer's link is down, which may block BUM traffic received from the peer link temporarily until an egress filter is removed.

Several error conditions that may be detected while in link up state 256, may cause FSM 250 to enter fail state 258, which may cause the local device to execute any enabled error handling processes at which point FSM 250 returns to link up state 256. In some embodiments, such error handling processes may include logging an error in connection with an error logging mechanism. Possible error conditions include the case where an MLAG member physical link is up, an egress filter is not installed, the peer response is true, and the peer's link is up as well as any situation in which an MLAG member physical link is up and the peer response is false. These error conditions typically occur upon initialization but stabilize as the MLAG pair runs for a period of time.

Figure 3:
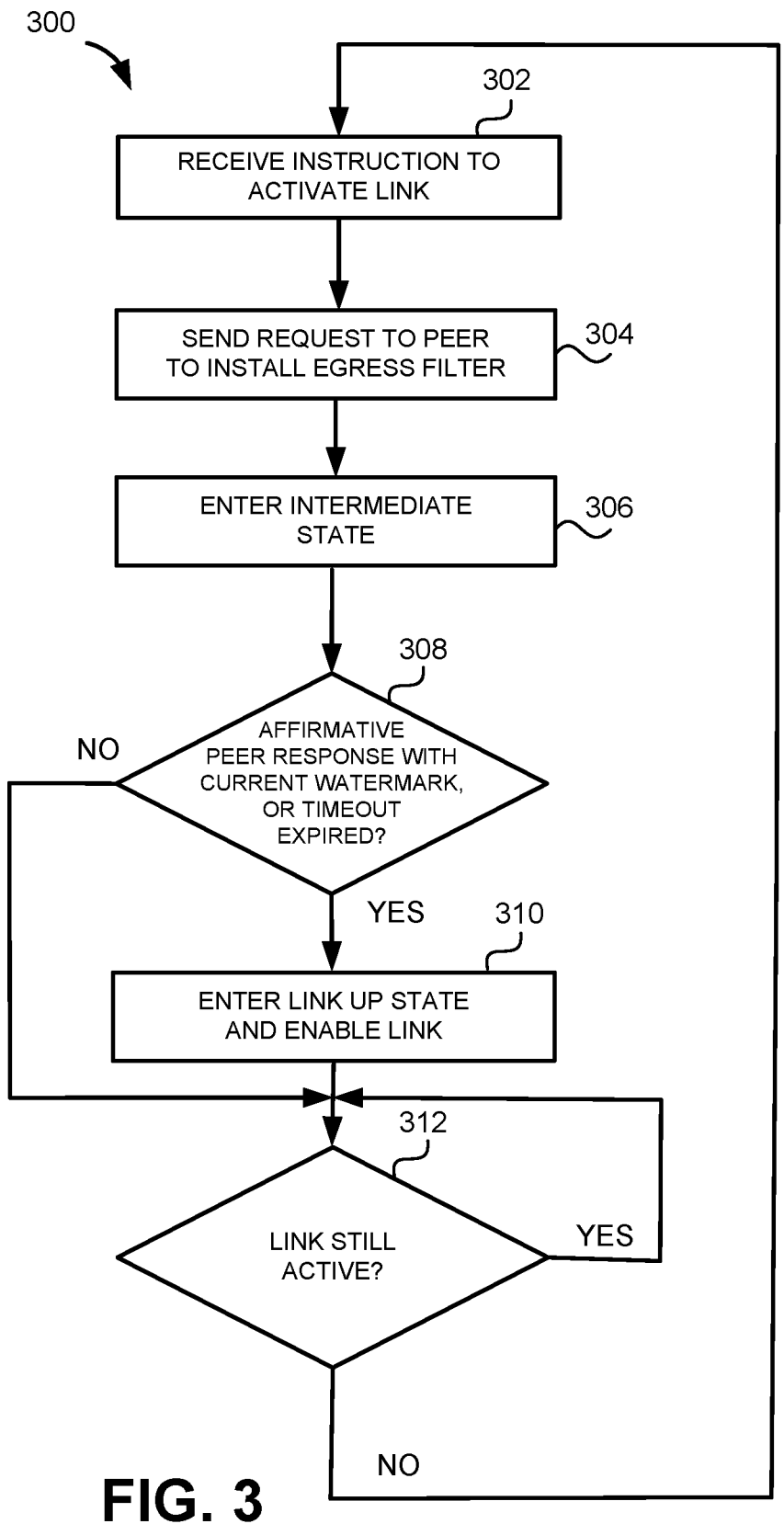
FIG. 3 illustrates an example method for coordinating MLAG host link status and associated egress filter installation according to one or more embodiments.

FIG. 3 illustrates an example method 300 for coordinating MLAG host link status and associated egress access according to one or more embodiments. At step 302, a local network device in a MLAG pair receives an instruction to activate one or more of its links. Typically, link activation occurs once a physical connection is activated and confirmed to be properly connected. In some embodiments, the instruction received at step 302 may be in response to initialization of a network device in an MLAG group, where the link is one of the active links in the MLAG group, however such an activation instruction may have any number of origins, including a switchover from the peer MLAG device due to connection failure of the peer MLAG device, etc.

Next, at step 304, the local network device of an MLAG pair sends a request to its MLAG peer to install an egress filter in the MLAG peer device. In some embodiments such a request may be sent by way of an inter-device messaging protocol. In some other embodiments, the request may be raised by way of updating one or more state data structures associated with the local network device. In some such embodiments, ongoing network connections between MLAG peer devices, such as a transmission control protocol (TCP) network connection are maintained so that state changes are shared in a relatively low-latency manner, such that when the local network device makes a state change, such a state change may be observed by the peer network device in near-real time. For example, the local network device may update a state value associated with the request for the peer device to install an egress filter in a central database associated with the local device. Such a state update in the central database would then trigger a shared state update in the ongoing peer state-sharing network connection, and the peer device could observe the state change in near-real time. In some embodiments, in connection with the state value that is persisted in a central database, a watermark counter is persisted. In some such embodiments, the watermark counter is a monotonically increasing integer of a fixed size that may overflow. This watermark counter may be shared with the peer device in connection with network-based state sharing mechanisms that are similar to the mechanisms used to share other state values between MLAG peer devices. In these embodiments, the peer device may use the watermark counter to mark any response to the request. As described above, when the peer device receives a request, it may install its egress filter, copy the watermark counter that was observed contemporaneously with receipt of the request state value, and provide a response confirming installation of the egress filter along with a copy of the contemporaneously obtained watermark counter value. At step 306, once the state value has been updated in the central database of the local device, the local device enters an intermediate state in its link FSM. As described above, this intermediate state allows the local device to ensure that the peer device has its egress filter installed prior to bringing up a corresponding link associated with the local device.

At test 308, it is determined whether an affirmative peer response is received stating that the peer device has, in fact, successfully installed its egress filter. In some embodiments, the affirmative peer response is further validated by comparing a watermark counter associated with the peer response with the watermark counter value that was presented in connection with the state change by which the local device provided a request to the peer device to install its egress filter. If the watermark counters match, the local device can be assured that the response corresponds to the current request. In cases where links are going down and coming back up in rapid succession, such synchronization is important to enable the MLAG pair to operate in concert to minimize packet loss and potential multiple delivery and/or loops. In addition to determining that an affirmative peer response is received, if a timeout of predetermined length expires, execution may also proceed to step 310.

If at test 308, it is determined that a valid affirmative peer response was received from the peer device, execution continues to step 310, at which point the local device enters a "link up" state and enables its link to forward network traffic over an MLAG member physical link. On the other hand, if at test 308, it is determined that either no response state is present indicating no response from the peer device or if the response is invalid, e.g., for not having a matching watermark counter, then execution continues to test 312 at which point the local device checks to see whether its MLAG member physical link is still active. If at test 312, it is determined that the MLAG member physical link is still active, then execution continues and this state is periodically monitored or a trigger is otherwise provided interrupting execution in the case that the peer device requests the local device to install its egress filter. If at test 312, the peer device determines that none of its physical links are active, execution continues to step 302. On the other hand, if at test 312 at least one physical link remains active, execution continues and the device remains in a "link up" state. At various points during execution of method 300, the peer device may request the local device to install its egress filter. When this occurs, the local device will install its egress filter and provide a response with an optional watermark counter corresponding to any watermark counter that was part of the peer request.

Example Network Device

Figure 4:
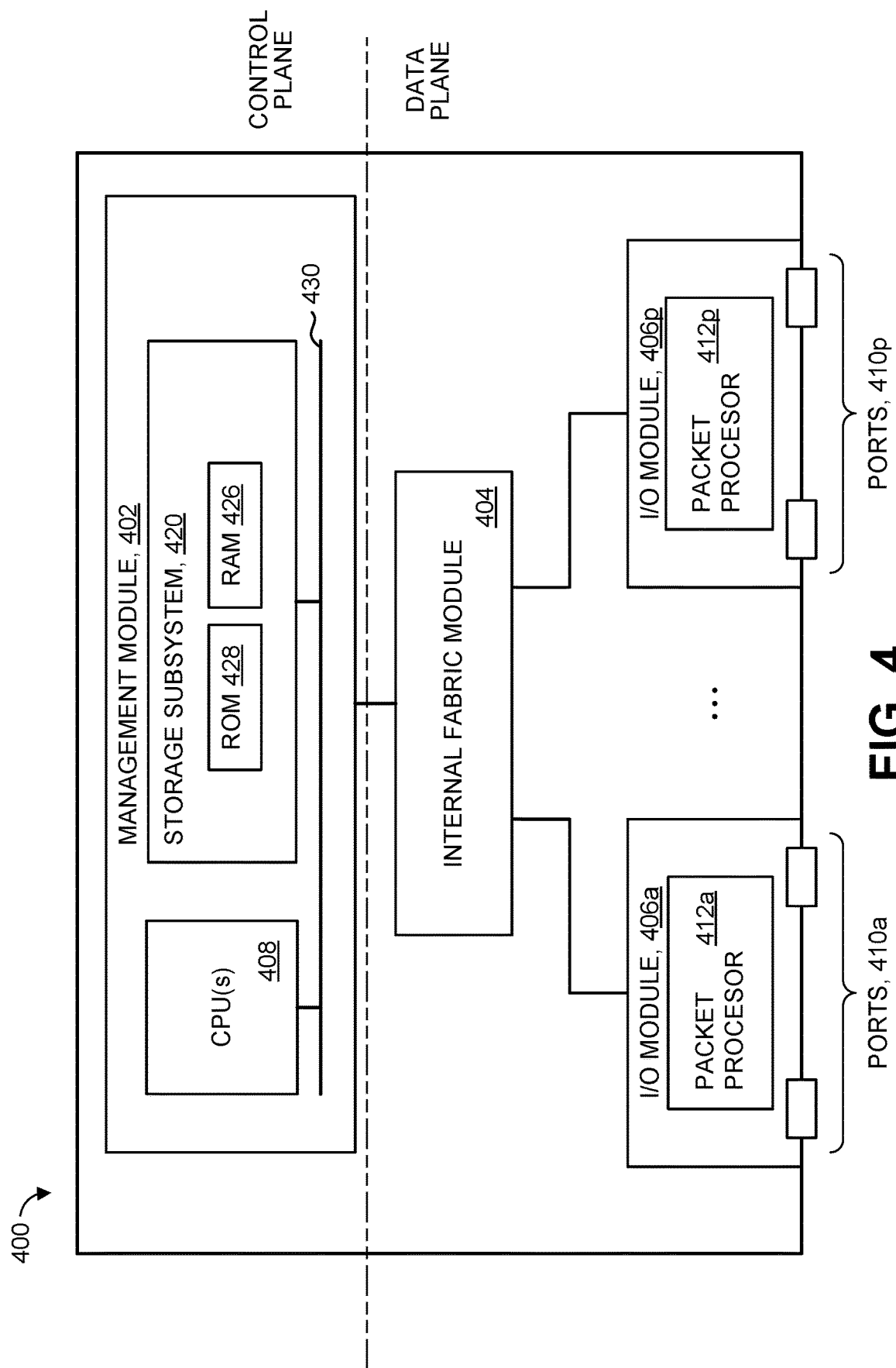
FIG. 4 illustrates an example of a network device that can be adapted in accordance with one or more embodiments.

FIG. 4 illustrates an example network device 400 that can be adapted in accordance with some embodiments of the present disclosure. Network device 400 may be a device or a router, for example. As shown, network device 400 may include management module 402, internal fabric module 404, and a number of I/O modules 406a-406p. Management module 402 may be disposed in a control plane (also referred to as control layer) of the network device 400 and can include one or more management CPUs 408 for managing and controlling operation of network device 400 in accordance with the present disclosure. Management CPU(s) 408 may be general-purpose processors, such as an Intel®/AMD® x86-64 or ARM® processor, that operates under the control of software stored in a memory, such as storage subsystem 420, which may include read-only memory (ROM) 428 and/or random-access memory (RAM) 426. The control plane refers to all the functions and processes that determine which path to use, such as routing protocols, spanning tree, and the like.

Internal fabric module 404 and I/O modules 406a-406p collectively represent a data plane of network device 400 (also referred to as data layer, forwarding plane, etc.). Internal fabric module 404 is configured to interconnect the various other modules of network device 400. Each I/O module 406a-406p includes one or more input/output ports 410a-410p that are used by network device 400 to send and receive network packets. Each I/O module 406a-406p can also include a packet processor 412a-412p. Each packet processor 412a-412p may comprise a forwarding hardware component configured to make wire speed decisions on how to handle incoming (ingress) and outgoing (egress) network packets. In some embodiments, the forwarding hardware can comprise an application specific integrated circuit (ASIC), a field programmable array (FPGA), a digital processing unit, or other such collection of configured logic.

Example Host Device

Figure 5:
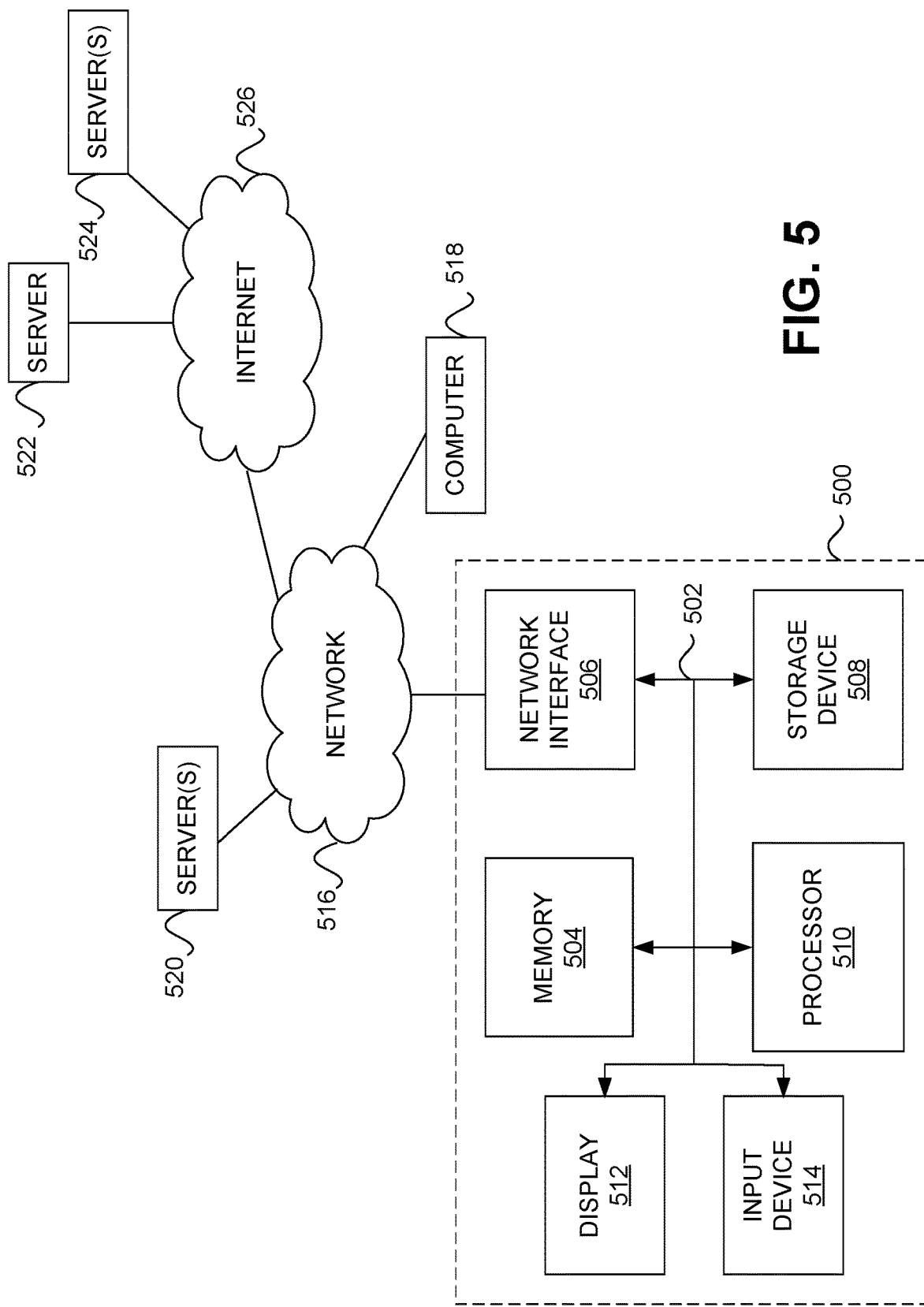
FIG. 5 illustrates an exemplary host hardware platform according to one or more embodiments.

FIG. 5 illustrates an exemplary hardware platform according to one or more embodiments. Computer 500 can be a desktop computer, a laptop computer, a server computer, a mobile device such as a smartphone or tablet, or any other form factor of general- or special-purpose computing device containing at least one processor. Depicted with computer 500 are several components, for illustrative purposes. Certain components may be arranged differently or be absent. Additional components may also be present. Included in computer 500 is system bus 502, via which other components of computer 500 can communicate with each other. In certain embodiments, there may be multiple busses or components may communicate with each other directly. Connected to system bus 502 is processor 510. Also attached to system bus 502 is memory 504. Also attached to system bus 502 is display 512. In some embodiments, a graphics card providing an input to display 512 may not be a physically separate card, but rather may be integrated into a motherboard or processor 510. The graphics card may have a separate graphics-processing unit (GPU), which can be used for graphics processing or for general purpose computing (GPGPU). The graphics card may contain GPU memory. In some embodiments no display is present, while in others it is integrated into computer 500. Similarly, peripherals such as input device 514 is connected to system bus 502. Like display 512, these peripherals may be integrated into computer 500 or absent. Also connected to system bus 502 is storage device 508, which may be any form of computer-readable media, such as non-transitory computer readable media, and may be internally installed in computer 500 or externally and removably attached.

Computer-readable media include both volatile and nonvolatile media, removable and nonremovable media, and contemplate media readable by a database. For example, computer-readable media include (but are not limited to) RAM, ROM, EEPROM, flash memory or other memory technology, CD-ROM, digital versatile discs (DVD), holographic media or other optical disc storage, magnetic cassettes, magnetic tape, magnetic disk storage, and other magnetic storage devices. These technologies can store data temporarily or permanently. However, unless explicitly specified otherwise, the term "computer-readable media" should not be construed to include physical, but transitory, forms of signal transmission such as radio broadcasts, electrical signals through a wire, or light pulses through a fiber-optic cable. Examples of stored information include computer-useable instructions, data structures, program modules, and other data representations.

Finally, network interface 506 is also attached to system bus 502 and allows computer 500 to communicate over a network such as network 516. Network interface 506 can be any form of network interface known in the art, such as Ethernet, ATM, fiber, Bluetooth, or Wi-Fi (i.e., the Institute of Electrical and Electronics Engineers (IEEE) 802.11 family of standards). Network interface 506 connects computer 500 to network 516, which may also include one or more other computers, such as computer 518, and network storage, such as cloud network storage. Network 516 is in turn connected to public Internet 526, which connects many networks globally. In some embodiments, computer 500 can itself be directly connected to public Internet 526.

One or more aspects or features of the subject matter described herein can be realized in digital electronic circuitry, integrated circuitry, specially designed application specific integrated circuits (ASICs), field programmable gate arrays (FPGAs) computer hardware, firmware, software, and/or combinations thereof. These various aspects or features can include implementation in one or more computer programs that are executable and/or interpretable on a programmable system including at least one programmable processor, which can be special or general purpose, coupled to receive data and instructions from, and to transmit data and instructions to, a storage system, at least one input device, and at least one output device. The programmable system or computing system can include clients and servers. A client and server are generally remote from each other and typically interact through a communication network. The relationship of client and server arises by virtue of computer programs running on the respective computers and having a client-server relationship to each other.

These computer programs, which can also be referred to as programs, software, software applications, applications, components, or code, include machine instructions for a programmable processor, and can be implemented in a high-level procedural language, an object-oriented programming language, a functional programming language, a logical programming language, and/or in assembly/machine language. As used herein, the term "computer-readable medium" refers to any computer program product, apparatus and/or device, such as for example magnetic discs, optical disks, memory, and Programmable Logic Devices (PLDs), used to provide machine instructions and/or data to a programmable processor, including a computer-readable medium that receives machine instructions as a computer-readable signal. The term "computer-readable signal" refers to any signal used to provide machine instructions and/or data to a programmable processor. The computer-readable medium can store such machine instructions non-transitorily, such as for example as would a non-transient solid-state memory or a magnetic hard drive or any equivalent storage medium. The computer-readable medium can alternatively or additionally store such machine instructions in a transient manner, for example as would a processor cache or other random-access memory associated with one or more physical processor cores.

Many different arrangements of the various components depicted, as well as components not shown, are possible without departing from the scope of the claims below. Embodiments of the invention have been described with the intent to be illustrative rather than restrictive. Alternative embodiments will become apparent to readers of this disclosure after and because of reading it. Alternative means of implementing the aforementioned can be completed without departing from the scope of the claims below. Certain features and sub-combinations are of utility and may be employed without reference to other features and sub-combinations and are contemplated within the scope of the claims. Although the invention has been described with reference to the embodiments illustrated in the attached drawing figures, it is noted that equivalents may be employed, and substitutions made herein without departing from the scope of the invention as recited in the claims. The subject matter of the present disclosure is described in detail below to meet statutory requirements; however, the description itself is not intended to limit the scope of claims. Rather, the claimed subject matter might be embodied in other ways to include different steps or combinations of steps similar to the ones described in this document, in conjunction with other present or future technologies. Minor variations from the description below will be understood by one skilled in the art and are intended to be captured within the scope of the present claims. Terms should not be interpreted as implying any particular ordering of various steps described unless the order of individual steps is explicitly described.

The following detailed description of embodiments references the accompanying drawings that illustrate specific embodiments in which the present teachings can be practiced. The described embodiments are intended to illustrate aspects of the disclosed invention in sufficient detail to enable those skilled in the art to practice the invention. Other embodiments can be utilized, and changes can be made without departing from the claimed scope of the invention. The following detailed description is, therefore, not to be taken in a limiting sense. The scope of embodiments is defined only by the appended claims, along with the full scope of equivalents to which such claims are entitled.

In this description, references to "one embodiment," "an embodiment," or "embodiments" mean that the feature or features being referred to are included in at least one embodiment of the technology. Separate reference to "one embodiment" "an embodiment", or "embodiments" in this description do not necessarily refer to the same embodiment and are also not mutually exclusive unless so stated and/or except as will be readily apparent to those skilled in the art from the description. For example, a feature, structure, or act described in one embodiment may also be included in other embodiments but is not necessarily included. Thus, the technology can include a variety of combinations and/or integrations of the embodiments described herein.

Having thus described various embodiments of the invention, what is claimed as new and desired to be protected by Letters Patent includes the following:

1. A computer-implemented method, executable by a local network device, for coordinating host link status and installation of local egress filters in the local network device in connection with a multi-chassis link aggregation group (MLAG) peer network device, the method comprising:
   in response to determining that a MLAG peer filter finite state machine (FSM) is in a "request peer to install filter" state indicating that the MLAG peer network device is sending the local network device a request to install a local egress filter:
      installing the local egress filter in the local network device, wherein the local egress filter is configured to block broadcast, unknown-unicast, and multicast (BUM) traffic transmitted through an MLAG connection between the local network device and the MLAG peer network device from egressing out of the local network device;
      incrementing a local filter-installed watermark value stored in a local state store,
      wherein the local filter-installed watermark value is associated with a local filter FSM; and
      entering the local filter FSM "egress filter installed" state; and
   in response to determining that the MLAG peer filter FSM is not in the "request peer to install filter" state:
      in response to determining that a link FSM of the local network device is in a "link down" state, uninstalling the local egress filter;
      in response to determining that the link FSM of the local network device is in a "link up" state, setting a local "peer filter install request" state to true;
      in response to determining that the link FSM of the local network device is in an "link request" state, setting the local "peer filter install request" state to true and based on determining that a peer-response filter-installed watermark value is equal to the local filter-installed watermark value, enabling a local MLAG member physical link; and
      in response to determining that the link FSM of the local network device is in the "link down" state, setting the local filter FSM "peer filter install request" state to false.

2. The method of claim 1, further comprising:
   in response to determining that the link FSM of the local network device is in a "link up" state and a peer link FSM is in a "link down" state, transitioning the link FSM to a "failure" state.

3. The method of claim 2, further comprising:
   logging an error message; and
   transitioning the link FSM back to a "link up" state.

4. The method of claim 1, wherein the filter-installed watermark value is a monotonically increasing integer having a maximum value associated with a storage size of the monotonically increasing integer.

5. The method of claim 4, wherein incrementing the filter-installed watermark value further comprises:
   in response to determining that the monotonically increasing integer has reached the maximum value, setting a rollover state in the local state store indicating that the monotonically increasing integer is rolling over to zero and setting the filter-installed watermark value to zero.

6. The method of claim 5, wherein the local state store is a centralized state database associated with the local network device.

7. The method of claim 1, further comprising:
   in response to determining that the link FSM of the local network device is in a "link requested" state and that a timeout has occurred, transitioning to a "link up" state and enabling the local MLAG member physical link.

8. One or more non-transitory computer-readable media storing computer-executable instructions that, when executed by a processor of a local device in a pair of multi-chassis link aggregation (MLAG) peer devices, perform a method of coordinating host link status and installation of egress filters in the pair of MLAG peer devices, the method comprising:
   receiving, by the local device, an instruction to activate a first MLAG member physical link of an MLAG of the pair of MLAG peer devices;
   sending a request to an MLAG peer device in the pair of MLAG peer devices to install an egress filter on a peer MLAG port-channel of the MLAG peer device that is connected to a second MLAG member physical link of the MLAG, wherein the egress filter is configured to block a first set of broadcast, unknown-unicast, and multicast (BUM) traffic transmitted through an MLAG connection between the local device and the MLAG peer device from egressing out of the MLAG peer device via the second MLAG member physical link;
   updating a status value in the local device to reflect that the local device is in an intermediate state prior to activating a local port of the local device that is connected to the first MLAG member physical link;
   receiving a response from the MLAG peer device indicating that the MLAG peer device has installed the egress filter on the peer MLAG port-channel of the MLAG peer device connected to the second MLAG member physical link, wherein the response from the MLAG peer device includes a response identifier;

in response to determining that the response from the MLAG peer device is a valid response, activating the first MLAG member physical link; and in response to determining that the MLAG peer device has raised a request for the local device to install a local egress filter on a local MLAG port-channel of the local device connected to the first MLAG member physical link, installing the local egress filter on the local MLAG port-channel, wherein the local egress filter is configured to block a second set of BUM traffic transmitted through the MLAG connection from egressing out of the local device via the first MLAG member physical link.

9. The one or more non-transitory computer-readable media of claim 8, wherein the method further comprises:

in response to determining that the response from the MLAG peer device is not a valid response and that a predetermined timeout time period has expired, activating the first MLAG member physical link.

10. The one or more non-transitory computer-readable media of claim 8, wherein the response identifier is a watermark counter.

11. The one or more non-transitory computer-readable media of claim 10, wherein the watermark counter is a monotonically increasing integer having a maximum value associated with a storage size of the monotonically increasing integer.

12. The one or more non-transitory computer-readable media of claim 8, wherein determining that the MLAG peer device has raised a request for the local device to install the local egress filter includes observing a filter requested state associated with the MLAG peer device, wherein the filter requested state is included in shared state information that is shared between the pair of MLAG peer devices.

13. The one or more non-transitory computer-readable media of claim 8, wherein the method further comprises:

in response to identifying an error condition associated with the activated MLAG member physical link, logging an error reflecting details regarding the error condition.

14. The one or more non-transitory computer-readable media of claim 8, wherein installing the local egress filter on the local device further comprises deactivating the first MLAG member physical link.

15. A local device in a pair of multi-chassis link aggregation (MLAG) peer devices, the local device comprising:

a processor; and one or more non-transitory computer-readable media storing computer-executable instructions that, when executed by the processor, perform a method comprising:

receiving, by the local device, an instruction to activate a first MLAG member physical link of an MLAG of the pair of MLAG peer devices;

sending a request to an MLAG peer device in the pair of MLAG peer devices to install an egress filter on a peer MLAG port-channel of the MLAG peer device that is connected to a second MLAG member physical link of the MLAG, wherein the egress filter is configured to block a first set of broadcast, unknown-unicast, and multicast (BUM) traffic transmitted through an MLAG connection between the local device and the MLAG peer device from egressing out of the MLAG peer device via the second MLAG member physical link;

updating a status value in the local device to reflect that the local device is in an intermediate state prior to activating a local port of the local device that is connected to the first MLAG member physical link;

receiving a response from the MLAG peer device indicating that the MLAG peer device has installed the egress filter on the peer MLAG port-channel of the MLAG peer device connected to the second MLAG member physical link, in response to determining that the response from the MLAG peer device is a valid response, activating the first MLAG member physical link; and in response to determining that the MLAG peer device has raised a request for the local device to install a local egress filter on a local MLAG port-channel of the local device connected to the first MLAG member physical link, installing the local egress filter on the local MLAG port-channel, wherein the local egress filter is configured to block a second set of BUM traffic transmitted through the MLAG connection from egressing out of the local device via the first MLAG member physical link.

16. The system of claim 15, wherein the method further comprises:

in response to determining that the response from the MLAG peer device is not a valid response and that a predetermined timeout time period has expired, activating the first MLAG member physical link.

17. The system of claim 16, wherein the response identifier is a watermark counter and wherein the response from the MLAG peer device includes a response identifier.

18. The system of claim 17, wherein the watermark counter is a monotonically increasing integer having a maximum value associated with a storage size of the monotonically increasing integer.

19. The system of claim 15, wherein determining that the MLAG peer device has raised a request for the local device to install the local egress filter includes observing a filter requested state associated with the MLAG peer device, wherein the filter requested state is included in shared state information that is shared between the pair of MLAG peer devices.

20. The system of claim 15, wherein installing the local egress filter on the local device further comprises deactivating the first MLAG member physical link.

* * * * *